United States Patent [19]

Thompson, Jr.

[11] Patent Number: 4,610,140
[45] Date of Patent: * Sep. 9, 1986

[54] TIDE ACTIVATED GENERATOR

[76] Inventor: Randall Thompson, Jr., 3 Craige St., Cambridge, Mass. 02138

[*] Notice: The portion of the term of this patent subsequent to Sep. 17, 2002 has been disclaimed.

[21] Appl. No.: 610,443

[22] Filed: May 15, 1984

Related U.S. Application Data

[63] Continuation-in-part of Ser. No. 581,828, Feb. 21, 1984, Pat. No. 4,541,242.

[51] Int. Cl.[4] .................... F03B 13/12; F16H 21/12; F16H 7/00
[52] U.S. Cl. .......................... 60/506; 74/63; 474/148
[58] Field of Search .................. 60/497–507; 74/63; 474/148

[56] References Cited

U.S. PATENT DOCUMENTS

| | | | |
|---|---|---|---|
| 559,969 | 5/1896 | Delmonte | 60/507 |
| 884,080 | 4/1908 | Fallis | 60/507 |
| 968,930 | 8/1910 | Fuchs | 60/507 |
| 3,567,953 | 3/1971 | Lord et al. | 290/42 |
| 3,668,412 | 6/1972 | Vrana et al. | 290/53 |
| 3,706,507 | 12/1972 | Dunbar | 415/7 |
| 3,746,875 | 7/1973 | Donatelli | 290/42 |
| 3,918,261 | 11/1975 | Bailey | 60/506 |
| 3,959,663 | 5/1976 | Rusby | 290/53 |
| 4,009,395 | 2/1977 | Long et al. | 290/53 |
| 4,092,828 | 6/1978 | Garza | 60/506 |
| 4,129,988 | 12/1978 | Turney | 60/499 |
| 4,208,878 | 6/1980 | Rainey | 60/496 |
| 4,249,085 | 2/1981 | Kertzman | 290/53 |
| 4,284,901 | 8/1981 | Giguere | 290/53 |

*Primary Examiner*—Allen M. Ostrager

[57] ABSTRACT

Apparatus for mechanical storage of energy derived from the rotation of a first shaft and for driving a rotatable main shaft associated with a power generator comprising, in combination, means for rotating the first shaft, connecting means for communicating the rotation of the first shaft to a first sprocketed sheave, and gear train means connecting the rotatable main shaft to a second sprocketed sheave and adapted to cause a rate of rotation of the rotatable main shaft greater than the rate of rotation of the second sprocketed sheave, the first and second sprocketed sheaves being in communication with one another by means of continuous, flexible connecting means disposed on the first and second sprocketed sheaves in non-sliding relationship therewith, the continuous, flexible connecting means having disposed thereon a weight which is raised by the rotation of the first sprocketed sheave, the second sprocketed sheave being capable of being rotated by the descent of the weight to cause rotation of the rotatable main shaft.

7 Claims, 4 Drawing Figures

4,610,140

TIDE ACTIVATED GENERATOR

BACKGROUND OF THE INVENTION

This is a continuation-in-part of pending application, Ser. No. 581,828, filed Feb. 21, 1984, now U.S. Pat. No. 4,541,242.

This invention relates to power generation and storage.

SUMMARY OF THE INVENTION

In general, the invention features apparatus for mechanical storage of energy derived from the rotation of a first shaft and for driving a rotatable main shaft associated with a power generator comprising, in combination, means for rotating the first shaft, connecting means for communicating the rotation of the first shaft to a first sprocketed sheave, and gear train means connecting the rotatable main shaft to a second sprocketed sheave and adapted to cause a rate of rotation of the rotatable main shaft greater than the rate of rotation of the second sprocketed sheave, the first and second sprocketed sheaves being in communication with one another by means of continuous, flexible connecting means disposed on the first and second sprocketed sheaves in non-sliding relationship therewith, the continuous, flexible connecting means having disposed thereon a weight which is raised by the rotation of the first sprocketed sheave, the second sprocketed sheave being capable of being rotated by the descent of the weight to cause rotation of the rotatable main shaft.

In preferred embodiments the flexible connecting means includes a continuous loop of chain; gear train means is intermediate the first shaft and the first sprocketed sheave; the second sprocketed sheave is capable of being rotated by the descent of the weight to cause rotation of the main shaft to an extent sufficient to permit the rotatable main shaft to achieve such rotation rate as is necessary to meet the desired power output of the power generator; the means for rotating the first shaft is a windmill; a turbine activated by the flow of water; a motor powered by solar energy; or apparatus for deriving energy from the rise and fall of a body of liquid including, in combination, float means adapted to move substantially in a vertical plane in response to the rise and fall of the body of liquid, means associated with the float means for converting the vertical movement into reciprocating rotational movement of a drive shaft, a ratcheted differential adapted to convert the reciprocating rotational movement of the drive shaft into rotational movement of the first shaft in a single direction, the ratcheted differential being associated with second gear train means for increasing the rate of rotational movement of the drive or the first shaft; the means for converting the vertical movement into reciprocating rotational movement comprises a quadrant gear; the ratcheted differential is intermediate the first gear train means and the first sprocketed sheave; the means for converting the vertical movement into reciprocating rotational movement comprise rack and pinion gears; the weight of the float when the body of liquid is falling is substantially equal to the buoyancy of the float when the body of liquid is rising; a clutch is interposed between the second gear train means and the associated ratcheted differential and the means associated with the float means for disconnection of the one from the other; the float means is an anchored boat; the float means communicates the vertical movement to one side of a fulcrum, the fulcrum having on its other side means for converting the vertical movement into reciprocating rotational movement of the drive shaft; and means for converting the vertical movement into rotational movement in a single direction comprises opposing rack gears communicating with pinion gears mounted on a pair of shafts, the pair of shafts communicating with the drive shaft, and each of the pinion gears being ratcheted such that only rotational movement thereof in a predetermined direction is communicated to the shaft upon which it is mounted.

In another aspect, the invention features apparatus for converting reciprocating rectilinear motion into rotational movement of a drive shaft in a single direction comprising, in combination, a pair of opposing rack gears, each of the rack gears being engaged with a pinion gear mounted on a shaft, the pinion gears being in engagement one with the other, and the shafts being in communication with the drive shaft, each of the pinion gears being ratcheted with respect to the shaft on which it is mounted such that only rotational movement of each of the pinion gears in a predetermined direction is communicated to the shaft upon which the pinion gear is mounted.

DESCRIPTION OF THE PREFERRED EMBODIMENTS.

The structure and operation of the preferred embodiments of the invention will now be described, after first briefly describing the drawings.

Drawings

STRUCTURE AND OPERATION

Figure 1:
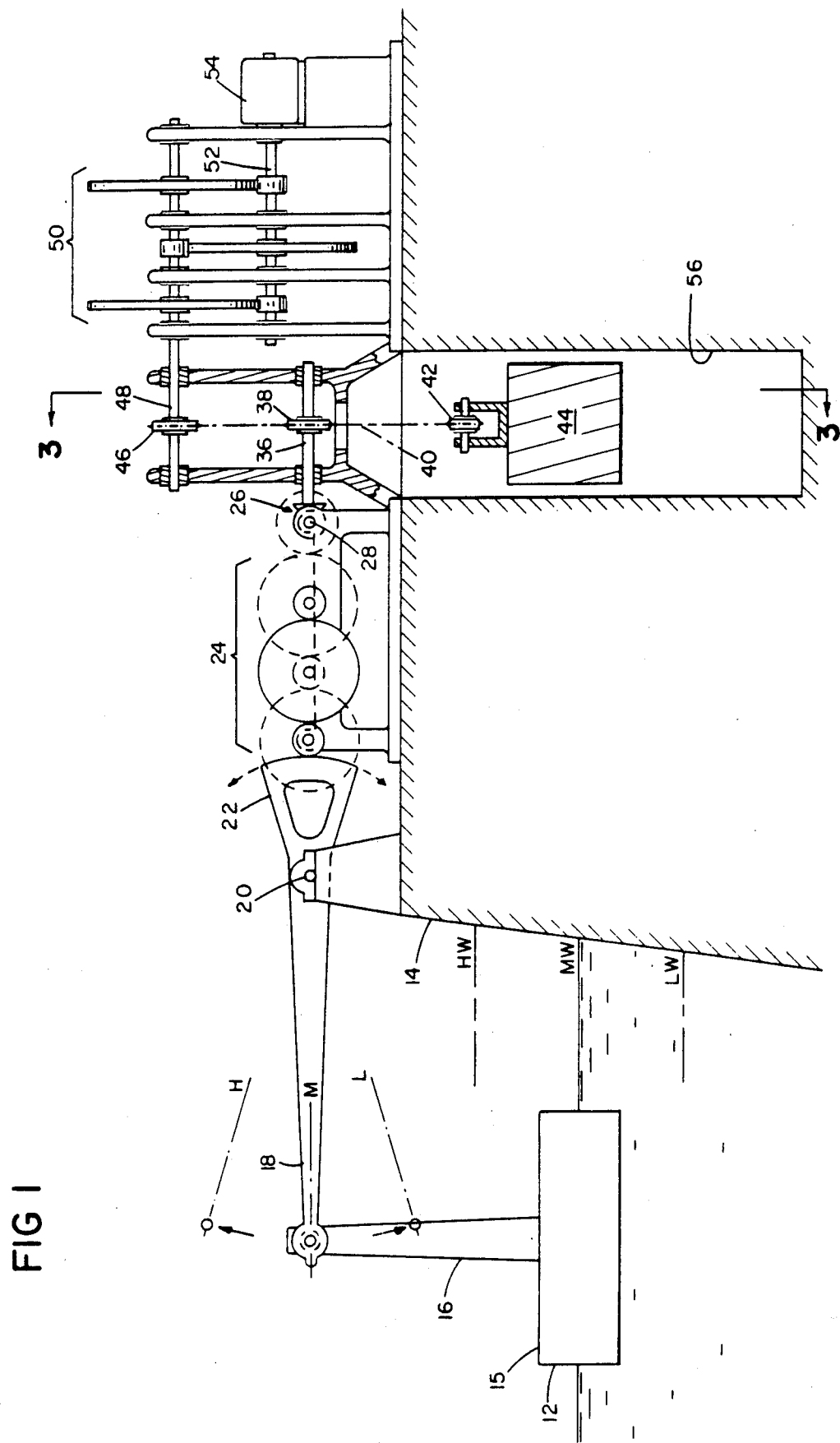
FIG. 1 is a side elevation view, partially sectioned, of a tide activated generator of the invention.

Referring to FIG. 1, the tide activated generator includes a float 12 which is placed on the surface of a body of water, such as the ocean, near a stationary structure 14 on which the remainder of the apparatus is mounted. Float 12 has weight, when the tide is falling, substantially equal to its buoyancy when the tide is rising. Stationary structure 14 may be on the shore, or on a man-made platform constructed for the purpose of carrying the remainder of the apparatus. Float 12 is restrained by lines and anchors (not shown) so that substantial horizontal movement of the float on the body of water is avoided.

Attached to the upper surface 15 of float 12 is connector 16, one end of which is attached to a lever arm 18, the fulcrum 20 of which is mounted on the shore. On the shore side of fulcrum 20 is quadrant gear 22 which is rotated in response to the reciprocating vertical movement of lever arm 18 caused by the rise and fall of the tide. In order to disconnect gear train 24 from quadrant gear 22, e.g. for enabling maintenance work to be done on the apparatus, a clutch or "throw out" gear (not shown), of conventional design, may be conveniently interposed between gear train 24 and quadrant gear 22.

The movement of quadrant gear 22 is transmitted, by conventional means, through gear train 24, schematically shown in FIG. 1. Gear train 24 increases the rate of the rotational movement transmitted from quadrant gear 22, while its torque is decreased.

Figure 2:
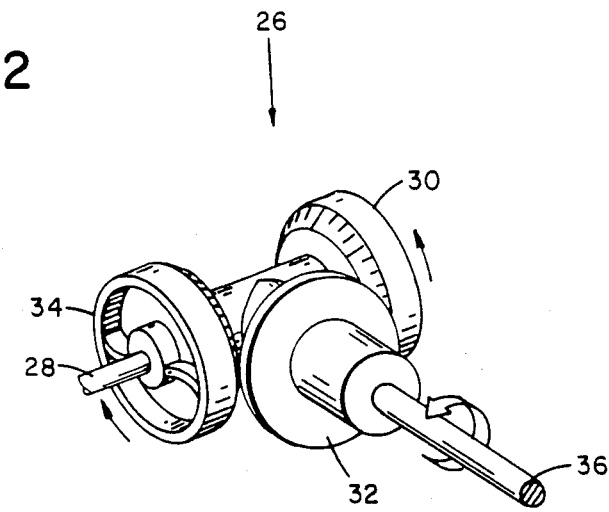
FIG. 2 is an isometric view of the ratcheted differential of the apparatus of FIG. 1.

At the end of gear train 24 is ratcheted differential 26, best shown in FIG. 2, which converts the reciprocating rotational movement, transmitted by gear train 24 from quadrant gear 22, into rotational movement in a single direction.

Referring now to FIG. 2, ratcheted differential 26 has three bevel gears 30, 32 and 34. Bevel gears 30 and 34 are mounted on shaft 28 which communicates with gear train 24 and receives therefrom the reciprocating rotational movement due to the rise and fall of the tide. The teeth of bevel gears 30 and 34 are always engaged with the teeth of bevel gear 32. Bevel gears 30 and 34 are ratcheted with respect to shaft 28, by conventional means, so that rotation of shaft 28 will be communicated to bevel gear 34 only when shaft 28 is rotating in a clockwise direction (as viewed in FIG. 2) and, conversely, only counter-clockwise rotation of shaft 28 (as viewed in FIG. 2) will be communicated from that shaft to bevel gear 30. Because of the ratcheted action within bevel gears 30 and 34, bevel gear 32, which is mounted on, and drives, shaft 36, will be driven in the same direction (as indicated by the arrow in FIG. 2) both when the tide is rising and when it is falling.

Figure 3:
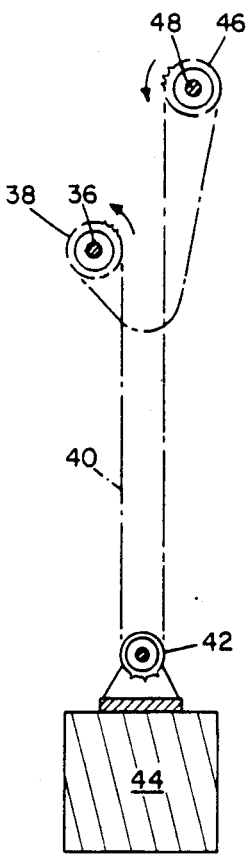
FIG. 3 is a schematic view of the weight, the sprocketed sheaves, and the flexible connecting means of the apparatus of FIG. 1.

Referring again to FIG. 1, there is mounted on shaft 36 sprocketed sheave 38 which is non-slidingly engaged with a portion of a continuous loop of chain 40 which extends over sheave 38, through sprocketed sheave 42, which is attached to weight 44, and over sprocketed sheave 46. Sheave 46 is also non-slidingly engaged with the portion of chain 40 with which it makes contact. As shown in FIG. 3, the rotation of sheave 38, in the direction of the arrow, raises weight 44.

Sheave 46 is mounted on shaft 48 which transmits the rotational movement of sheave 46 through gear train 50, schematically shown in FIG. 1, to power shaft 52. Gear train 50 increases the rate of the rotational movement of sheave 46 while its torque is decreased. Power shaft 52 is associated with a conventional generator 54 for generating electric power.

Associated with sheave 46 is a control mechanism, not shown (which can be of any of a variety of designs within the skill of an engineer of ordinary ability), capable of preventing the rotation of sheave 46 until generator 54 is desired to be activated, and of controlling the tendency of sheave 46 to rotate in the direction of the arrow (see FIG. 3) in response to gravitational force acting on weight 44. The control mechanism permits the rotational rate of sheave 46 (and thus the rotational rate of shaft 48) to be controlled such that only the rate necessary to achieve the desired power output of generator 54 is provided in shaft 48.

As shown in FIG. 1, weight 44 is suspended in well 56, beneath sheaves 38 and 46. The depth of well 56 depends on the height of the tide and the anticipated frequency of use of generator 54.

At installation, weight 44 is positioned towards the lower end of well 56, and the control mechanism associated with sheave 46 is locked so that rotation of shaft 48 is impeded. As the tide rises and falls, that vertical movement is transmitted by lever arm 18 to quadrant gear 22 which, through gear train 24 and ratcheted differential 26, causes sheave 38 to rotate, thus raising weight 44.

When activation of generator 54 is desired, the control mechanism is released to the desired extent, thus permitting the force of gravity acting on weight 44 to cause sheave 46 to rotate. Because chain 40 is a continuous loop, sheave 46 can be rotated at any time during the cycle of the tide. At slack water (at high and low tide) when there will be little movement of lever arm 18, and thus little rotation of sheave 38, weight 44 will fall upon release of the control mechanism; similarly, if power demand is very severe, and the desired rotation rate of shaft 48 is greater than that produced at sheave 38, weight 44 will fall. At other times, however, when the per unit rate of potential energy stored is equal to the energy being provided to generator 54, the weight will appear to stand still. In this mode, there is in effect direct drive of generator 54 from the tidal action. At still other times, when the energy required at generator 56 is less than the energy input at sheave 38, generator 54 may be driven even though the weight is rising. In this last mode, the apparatus will store the excess energy, available from the tidal movement, by raising the weight.

In areas where inclement weather conditions are frequently experienced, the apparatus may be located some distance from the ocean so that that portion of the apparatus on the ocean side of fulcrum 20 may be protected from high seas. In such circumstances, the body of water upon which float 12 rests may be that contained in a man-made reservoir which communicates with the ocean by any suitable aquaduct such that the body of water in the reservoir will rise and fall as ocean tide rises and falls.

Figure 4:
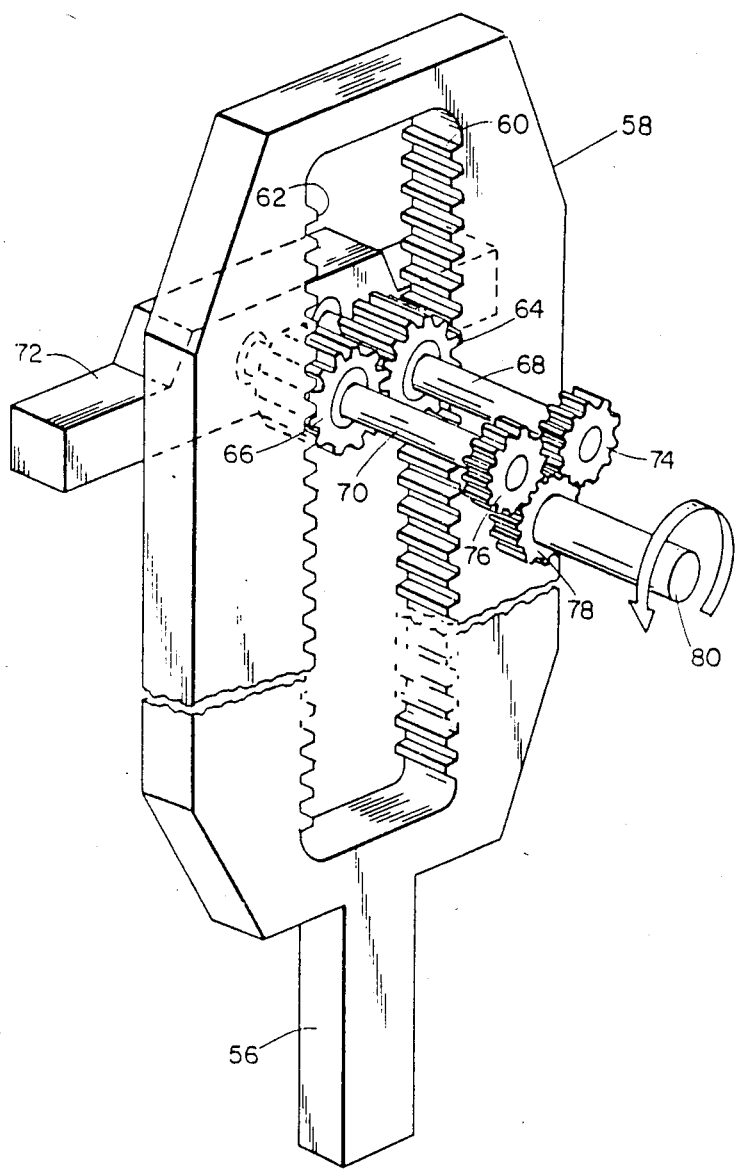
FIG. 4 is an isometric partial view of means for converting reciprocating rectilinear movement of the float into rotational movement in a single direction.

In place of connector 16, lever arm 18 and quadrant gear 22, a rack and pinion gear arrangement (as shown in FIG. 4) may be used to convert the vertical movement of float 12 into the rotational movement transmitted to gear train 24. In this mode, the need for ratcheted differential 26 is eliminated.

Referring to FIG. 4, post 56 is attached to the upper surface of the float. At the upper end of post 56 is block 58 which has a cavity within which are formed rack gears 60 and 62. Engaging respectively racks 60 and 62 are pinion gears 64 and 66. The distance separating racks 60 and 62 is such that the teeth of pinions 64 and 66 engage each other as well as the adjacent racks.

Pinions 64 and 66 are mounted on shafts 68 and 70 respectively which terminate, at one end, in bearings within block 72 which is rigidly mounted. At the other end of shafts 68 and 70 are mounted gears 74 and 76, the teeth of which engage gear 78 which is mounted on drive shaft 80. Drive shaft 80 communicates with gear train 24 in FIG. 1. Gears 74 and 76 are disposed sufficiently apart to prevent engagement of their teeth.

Pinion gears 64 and 66 are ratcheted (by conventional means), with respect to the shafts on which they are mounted, so that rack 62 communicates rotational movement to shaft 70 only when the float (and thus block 58) is rising on the tide, and rack 60 communicates rotational movement to shaft 68 only when the float (and thus block 58) is falling with the tide. Thus, notwithstanding the rise and fall of the tide, shaft 80 rotates only in the direction of the arrow shown in FIG. 4.

Advantageously, because there is continuous engagement of rack gears and pinion gears in the rack and pinion gear arrangement of FIG. 4, great stability is maintained in the unit. Additionally, throughout the reciprocation cycles, true engagement of pinion and rack gears is maintained without slippage, thus eliminating wear on the gear teeth caused by slippage.

OTHER EMBODIMENTS

Other embodiments are within the following claims.

For example, in locations where it may be difficult or inconvenient to excavate a well in which to suspend weight 44, well 56 may be replaced with a tower in which weight 44 may be raised and lowered. Also, float 12 may be a docked boat to which lever arm 18 is attached, or the portion of the apparatus shown in FIG. 1 as being attached to stationary structure 14 may be placed on e.g. a boat tied to, or at anchor near, a dock, with lever arm 18 attached to the dock. The portion of the apparatus shown in FIG. 1 as being attached to stationary structure 14 may be placed on a boat, with lever arm 18 extending over the side of the boat and connector 16 attached to the ocean floor. Indeed, any arrangement in which reciprocating vertical movement about fulcrum 20 is achieved may be harnessed to practice my invention.

Also, as mentioned earlier, the source of the rotational movement transmitted to shaft 36, for rotation of sheave 38, need not be the rise and fall of a body of water. For example, a windmill or similar wind activated device, a turbine or similar device activated by moving water, or a motor driven by solar energy, may be used to provide power for rotating shaft 36.

In another embodiment, rotation of shaft 36 can be used to drive a pump for raising liquid from a reservoir into an elevated holding tank from which the liquid is released to drive e.g. a turbine for the generation of electricity. The liquid at the discharge end of the turbine may be conducted into the reservoir from which the liquid is pumped, thus establishing a closed-loop recycling of the liquid.

What is claimed is:

1. Apparatus for mechanically storing energy derived from the rotation of a first shaft and for driving a rotatable main shaft associated with a power generator comprising, in combination, means for rotating said first shaft, connecting means for communicating said rotation of said first shaft to a first sprocketed sheave, and gear train means connecting said rotatable main shaft to a second sprocketed sheave and adapted to cause a rate of rotation of said second sprocketed sheave, said first and second sprocketed sheaves being in communication with one another by means of continuous, flexible connecting means disposed on said first and second sprocketed sheaves in non-sliding relationship therewith, said continuous, flexible connecting means having disposed thereon a weight which is raised by the rotation of said first sprocketed sheave, said second sprocketed sheave being capable of being rotated by the descent of said weight to cause rotation of said rotatable main shaft said first sprocketed sheave and said second sprocketed sheave being adapted to rotate independently in response to rate of energy derivation and energy requirement, respectively, and said weight disposed therebetween being adapted to be raised and lowered on said continuous flexible connecting means in automatic response to difference in energy derivation and energy requirement.

2. The apparatus of claim 1 wherein said continuous, flexible connecting means comprises a continuous loop of chain.

3. The apparatus of claim 1, further comprising additional gear train means intermediate said first shaft and said first sprocketed sheave.

4. The apparatus of claim 1 wherein said second sprocketed sheave is capable of being rotated by the descent of said weight to cause rotation of said main shaft to an extent sufficient to permit said rotatable main shaft to achieve such rotation rate as is necessary to meet the desired power output of said power generator.

5. The apparatus of claim 1 wherein said means for rotating said first shaft is a windmill.

6. The apparatus of claim 1 wherein said means for rotating said first shaft is a turbine activated by the flow of water.

7. The apparatus of claim 1 wherein said means for rotating said first shaft is a motor powered by solar energy.

* * * * *